S. W. HARRIS.
VULCANIZER.
APPLICATION FILED MAR. 18, 1919.

1,306,008.

Patented June 10, 1919.

STANLEY W. HARRIS
INVENTOR

WITNESSES:

UNITED STATES PATENT OFFICE.

STANLEY W. HARRIS, OF AKRON, OHIO, ASSIGNOR TO THE AKRON RUBBER MOLD & MACHINE COMPANY, OF AKRON, OHIO, A CORPORATION OF OHIO.

VULCANIZER.

1,306,008.  Specification of Letters Patent.  Patented June 10, 1919.

Application filed March 18, 1919. Serial No. 283,395.

*To all whom it may concern:*

Be it known that I, STANLEY W. HARRIS, a citizen of the United States, residing at Akron, in the county of Summit and State of Ohio, have invented certain new and useful Improvements in Vulcanizers; and I do hereby declare the following to be a full, clear, and exact description of the invention, such as will enable others skilled in the art to which it appertains to make and use the same.

This invention relates to certain new and useful improvements in vulcanizers, and contemplates more especially the production of an improved device for effectually retreading and repairing tire casings and other vulcanizable products.

An object of the present invention is the production of a repair vulcanizer in which novel means is provided for gradually reducing and merging the intensity of the vulcanizing heat at the ends of the vulcanizer housing, thereby preventing the formation of ridges and other scar marks now caused by the extreme differences in the temperatures to which that portion of the tire within the housing and the remaining portion of the tire exposed to the atmosphere are respectively subjected, at points approximating what are usually termed the end walls of the vulcanizer.

Another object of this invention is to produce a repair vulcanizer having means detachably secured to the end walls of the vulcanizer for protecting an operator against possible injury from burning, which frequently occurs when inserting and removing the tire from the present type of repair vulcanizer.

Another object of this invention is the production of a repair vulcanizer having auxiliary end walls composed of material having the non-heat-conducting qualities of asbestos, wood and the like.

A further object of the present invention is the production of an auxiliary end wall for a repair vulcanizer consisting of a chambered interior formed by positioning alternate layers of non-heat-conducting material.

With these and other objects in view the invention further consists in the particular construction and arrangement of the several elements hereinafter described and pointed out in the appended claims.

In the accompanying drawings illustrating certain embodiments of my invention,

Figure 1:
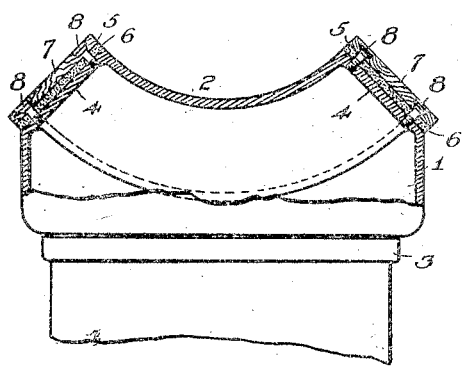
Figure 1 is a sectional elevation through a multi-cavity repair vulcanizer showing the auxiliary end walls in position.
Figure 2:
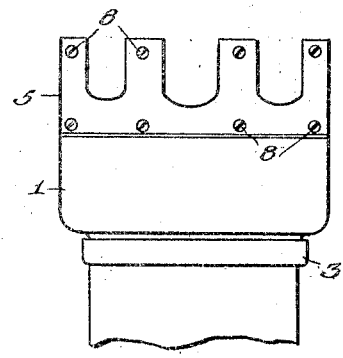
Fig. 2 is an end elevation thereof.

The present invention has been designed to overcome certain difficulties now experienced in connection with the use of the ordinary type of tire repair vulcanizers, wherein the tire after being repaired is scarred with ridges and other markings at points immediately adjacent the end walls of the vulcanizer housing. These ridges and scars are due to the swelling of the rubber because of the intense heat within the vulcanizer housing and the relatively cool atmospheric temperature immediately outside of the end walls of said housing. It has been found that the interposing of means for gradually reducing this intense heat and merging same with the atmospheric temperature at points where the tire casing leaves the housing of the vulcanizer will prevent the formation of these marks and leave the tire free from all disfigurements after the vulcanizing process. Certain attempts have heretofore been made to prevent this disfigurement in vulcanizing by the use of single wooden blocks, but they have been attended with practical disadvantages of non-durability and consequent expense.

Referring to the drawings in which corresponding reference characters designate similar parts, the vulcanizer 1 may be of the ordinary multi-cavity type provided with the usual body portion or housing 2 in which the heating medium circulates. A burner 3, or other means of generating the vulcanizing heat is also provided.

The construction of the vulcanizer may be of any well known type, and a further description thereof will not be given.

The usual end walls 4 are shown as formed integral with the housing 2, and are of a notched or cut-away shape as shown, depending upon the number of tire receiving cavities.

The auxiliary end wall 5 is adapted to be secured to each end wall 4 of the housing 2, and comprises composite layers of asbestos and wood, respectively. The asbestos sheet 6 is preferably applied immediately adjacent the end walls 4 and serves to arrest the greater intensity of the heat. The layer of wood 7 is affixed against the sheet of asbestos 6, and in addition to protecting the said sheet of asbestos, acts to further reduce the intensity of the heat. Suitable screws 8 are shown as a means of detachably securing the said layers in position against the end walls 4. These screws are preferably countersunk in the layer of wood and screw into the end walls 4, as shown. By this construction the metal heads of the screws are sufficiently impressed into the auxiliary end walls 5 to prevent their burning the hands of the operator.

Figure 3:
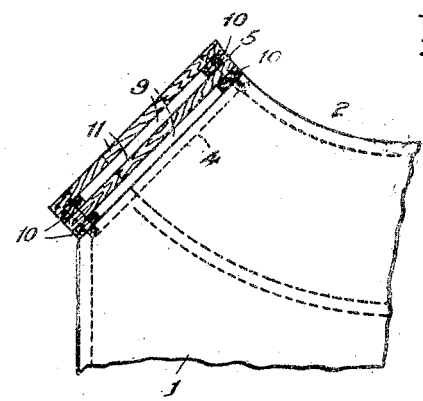
Fig. 3 is an enlarged sectional view illustrating a modified form of auxiliary end wall.

In the form of auxiliary end wall illustrated in Fig. 3, the superimposed layers of non-heat-conducting material are arranged to provide a chambered interior construction for the circulation as well as the arresting of the intense vulcanizing heat. This chambered interior 9 is formed by interposing strips of asbestos 10 between the layers of wood 11. These strips may be of various lengths and conform to the contour of the end wall of the multi-cavity vulcanizer. Likewise, any number of these alternate layers of non-heat-conducting material may be inserted, whereby an even reduction and gradual merging of the intense vulcanizing heat is accomplished.

It will also be understood that any number of sheeted layers suitably laminated as shown in Fig. 1, may be used for building up an effective auxiliary end wall.

From the foregoing it will be apparent that an auxiliary end wall has been produced in which the thickness thereof may be varied for effectually accomplishing the objects hereinbefore set forth. While I have shown and described the use of asbestos and wood, I do not limit myself to the same, as other materials of non-heat-conducting qualities may be used.

I claim:

1. In a repair vulcanizer the combination with a chambered cavity portion having end walls and auxiliary end walls detachably secured to the aforesaid end walls, said auxiliary end walls being formed of composite layers of asbestos and wood.

2. In a repair vulcanizer the combination with a chambered cavity portion having end walls and auxiliary end walls detachably secured to the aforesaid end walls, said auxiliary end walls being formed of superimposed alternate layers of non-heat-conducting material.

3. In a repair vulcanizer the combination with a chambered cavity portion having end walls and auxiliary end walls detachably secured to the aforesaid end walls, said auxiliary end walls being formed of superimposed alternate layers of variable non-heat-conducting material.

4. In a repair vulcanizer the combination with a chambered cavity portion having end walls and auxiliary end walls detachably secured to the aforesaid end walls, said auxiliary end walls being formed of a chambered interior and superimposed layers of non-heat-conducting material.

5. In a repair vulcanizer the combination with a chambered cavity portion having end walls and auxiliary end walls detachably secured to the aforesaid end walls, said auxiliary end walls being formed of superimposed layers of non-heat-conducting material, and means for detachably securing said layers in position.

6. In a repair vulcanizer the combination with a chambered cavity portion having end walls and auxiliary end walls detachably secured to the aforesaid end walls, said auxiliary end walls being formed of superimposed layers of non-heat-conducting material, and means including countersunk screws for detachably securing said layers in position.

7. A built up auxiliary end wall for repair vulcanizers comprising a series of laminated sheets of non-heat-conducting materials.

8. A built up auxiliary end wall for repair vulcanizers, comprising a series of laminated sheets of variable non-heat-conducting materials.

9. A built up auxiliary end wall for repair vulcanizers comprising a series of alternately laminated sheets of asbestos and wood.

10. A built up auxiliary end wall for repair vulcanizers comprising a series of laminated sheets of non-conducting materials having air chambers formed therebetween.

11. A built up auxiliary end wall for repair vulcanizers comprising a series of laminated sheets of non-conducting materials having a series of notches formed on one edge thereof.

In testimony whereof I affix my signature, in presence of two subscribing witnesses.

STANLEY W. HARRIS.

Witnesses:
W. F. WILSON,
CURT KUENTZEL.